United States Patent
Wright et al.

(10) Patent No.: US 9,003,775 B2
(45) Date of Patent: Apr. 14, 2015

(54) FLUID DOSING DEVICE

(75) Inventors: Keith E. Wright, Chatham (GB);
Michael Peter Cooke, Gillingham (GB);
Phillip D. Thompson, Rainham (GB);
Simon Coster, Lye Green (GB); Nick J. Oldfield, Maidstone (GB); Martin Paul Hardy, Gillingham (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 274 days.

(21) Appl. No.: 13/321,201

(22) PCT Filed: May 20, 2010

(86) PCT No.: PCT/EP2010/057001
§ 371 (c)(1),
(2), (4) Date: Nov. 28, 2011

(87) PCT Pub. No.: WO2010/133685
PCT Pub. Date: Nov. 25, 2010

(65) Prior Publication Data
US 2012/0085085 A1    Apr. 12, 2012

(30) Foreign Application Priority Data
May 20, 2009  (GB) .................................. 0908690.1

(51) Int. Cl.
*F01N 3/36* (2006.01)
*F01N 3/20* (2006.01)
*F01N 13/18* (2010.01)

(52) U.S. Cl.
CPC ................ *F01N 3/2066* (2013.01); *F01N 3/36* (2013.01); *F01N 13/18* (2013.01); *F01N 2610/02* (2013.01); *F01N 2610/14* (2013.01); *F01N 2610/1433* (2013.01); *F01N 2610/1453* (2013.01); *Y02T 10/24* (2013.01)

(58) Field of Classification Search
USPC .......................... 60/286, 295; 239/88, 533.2
See application file for complete search history.

(56) References Cited

U.S. PATENT DOCUMENTS

| | | | | |
|---|---|---|---|---|
| 5,129,658 | A * | 7/1992 | Berton et al. ................. | 277/591 |
| 6,240,897 | B1 * | 6/2001 | Han ............................. | 123/305 |
| 6,517,080 | B1 * | 2/2003 | Pressler ....................... | 277/440 |
| 8,622,316 | B2 | 1/2014 | Haeberer et al. | |
| 2004/0050972 | A1 * | 3/2004 | Winter ....................... | 239/533.2 |

(Continued)

FOREIGN PATENT DOCUMENTS

| EP | 1 878 920 | 1/2008 |
|---|---|---|
| EP | 2 253 814 | 11/2010 |

(Continued)

OTHER PUBLICATIONS

International Search Report dated Jul. 30, 2010.

(Continued)

*Primary Examiner* — Thomas Denion
*Assistant Examiner* — Jorge Leon, Jr.
(74) *Attorney, Agent, or Firm* — Thomas N. Twomey (57) ABSTRACT

A mounting arrangement for attaching a pump arrangement to an exhaust pipe at a boss includes a delivery nozzle section and a remaining section including a pump body. The mounting arrangement includes a packing for supporting the pump body at the remaining section of the pump arrangement.

11 Claims, 3 Drawing Sheets

(56) References Cited

U.S. PATENT DOCUMENTS

| | | | |
|---|---|---|---|
| 2004/0178285 A1* | 9/2004 | Forrest | 239/381 |
| 2008/0011780 A1* | 1/2008 | Cooke | 222/135 |
| 2008/0014103 A1* | 1/2008 | Cooke | 417/410.1 |
| 2008/0197216 A1* | 8/2008 | Feinleib | 239/533.3 |
| 2008/0236147 A1* | 10/2008 | Van Vuuren et al. | 60/295 |
| 2009/0235650 A1* | 9/2009 | Pollitt et al. | 60/295 |
| 2009/0293460 A1* | 12/2009 | Hirata et al. | 60/286 |
| 2010/0186393 A1* | 7/2010 | Kowada | 60/295 |

FOREIGN PATENT DOCUMENTS

| | | |
|---|---|---|
| JP | 2008-19866 | 1/2008 |
| JP | 2008-19868 | 1/2008 |
| WO | 2008/080695 A1 | 7/2008 |

OTHER PUBLICATIONS

English Translation of Japan Office Action dated Mar. 28, 2013.

* cited by examiner

FIGURE 3

FLUID DOSING DEVICE

TECHNICAL FIELD

This invention relates to fluid dosing devices for exhaust systems for internal combustion engines. In particular, but not exclusively, the invention relates to a fluid dosing device for dispensing reagent into an exhaust gas stream, and to methods, means and components for mounting a fluid dosing device to an exhaust pipe, including a mounting arrangement.

BACKGROUND TO THE INVENTION

In the Applicant's European Patent Application Publication No. EP 1 878 920 A1, a solenoid-operated reagent dosing pump is described. Such a pump is typically used to supply a reagent, such as a reducing agent, via a nozzle, for dispersion into an exhaust gas stream within an exhaust pipe of a vehicle. This arrangement can be useful as part of a selective catalytic reduction system (SCR) for reducing harmful exhaust gas emissions from vehicle engines.

In some cases, it is desirable to mount a pump directly on the exhaust pipe, so that an output nozzle of the pump extends through a port in the exhaust pipe for delivery of the reagent to the exhaust gas stream. The pump must be attached securely to the exhaust pipe, and in such a way that there is no leakage of exhaust gases through the port.

The Applicant's European Patent Application No. 08169996.9 ("EP 08169996.9"), which is incorporated herein by reference, provides a pump mounting arrangement comprising: a boss attached or attachable to an exhaust pipe, and retaining means for retaining the pump in the boss, in use, wherein the retaining means comprises interfacial O-rings for damping vibration of the pump. The O-rings ensure that there is no rigid or stiff mechanical connection between the pump and the mounting boss or the exhaust.

Because the O-rings, located in an interfacial region between the pump and boss, are non-rigid, vibrations from the reciprocating solenoid within the pump are transmitted to the exhaust pipe to a lesser degree than would otherwise be the case. Instead, the vibrations are damped by the O-rings, so that the pump is acoustically decoupled from the exhaust pipe. Consequently, the operating noise of the pump is not appreciably amplified by the exhaust pipe when the pump is in use.

The O-rings also serve to reduce heat transfer by conduction from the exhaust pipe to the pump, for example when the O-rings are of a polymeric material such as rubber. Thus, in this case, the pump is, to an extent, also thermally decoupled from the exhaust pipe. This helps to reduce the amount of cooling of the pump and reagent required for efficient and reliable operation of the pump.

When a portion of the output nozzle of a dosing pump or other dosing device is positioned within the bore of an exhaust pipe, the output nozzle is subject to heating from the hot exhaust gases that flow through the pipe when the engine is in use. As well as reducing heat transfer by conduction from the walls of the exhaust pipe, it is therefore also desirable to minimise the heating effect of the hot gas stream on the output nozzle.

Against the above background, the present invention has been devised to further improve the design of a fluid dosing device and the mounting arrangement for a reagent dosing device in an exhaust pipe, for example in terms of durability and heat transfer reduction.

SUMMARY OF THE INVENTION

A first aspect of the invention is based on the appreciation that durability, and preferably heat transfer reduction, can be enhanced by supporting, damping and insulating the pump remotely from a mounting boss interface region.

Accordingly, in this first aspect, there is provided a mounting arrangement for attaching a pump arrangement to an exhaust pipe at a boss. The pump arrangement comprises a delivery nozzle section and a remaining section including a pump body, and the mounting arrangement comprises packing means for supporting the pump body at the remaining section of the pump arrangement. The remaining section of the pump arrangement may comprise more than half the weight of the pump arrangement and/or the centre of mass of the pump arrangement.

The mounting arrangement may further comprise retaining means for retaining the nozzle section of the pump arrangement in the boss, in use. The mounting arrangement may be cooperable with the retaining means. Optionally, the retaining means need not be in direct connection or cooperation with the nozzle section, but can instead be arranged to hold the nozzle section in position in the boss such that the nozzle section is spaced from the boss.

Conveniently, the retaining means defines a volume for receiving the packing means. The packing means may comprise one or more inserts of packing material, the inserts being received within the volume. In one embodiment, the retaining means comprises a can that defines the volume, and the packing means and the pump body are received within the can. The volume may optionally be sealable. Preferably, a majority of the weight of the pump arrangement, and/or the centre of mass of the pump arrangement, may be received within the volume defined by the retaining means.

The retaining means may be arranged to be rigidly cooperable with the boss. The retaining means may include a mounting element, such as a mounting nut or sleeve, arranged to rigidly cooperate with the boss. The packing means may provide flexible support for the pump body with respect to the retaining means.

Advantageously, the packing means may be arranged to damp vibration of the pump body. Alternatively, or in addition, the packing means may be arranged to thermally insulate the pump body. Expressed in another way, the packing means may oppose the ingress of heat into the pump body.

To further enhance acoustical and thermal decoupling, particularly during periods of high agitation and vibration, the retaining means may comprise one or more compressible interfacial members, such as, for example, O-rings, which hold the pump arrangement and/or retaining means in place in the region of a boss interface in such a way that no part of the pump arrangement is in direct mechanical (i.e. rigid) contact with the boss or exhaust pipe. The interfacial members may preferably seal the pump arrangement in the boss so that exhaust gases cannot escape.

The or each interfacial member may be arranged to locate the pump arrangement with respect to the boss or retaining means. In this regard, the interfacial members may, for example engage a chamfered edge of the boss or retaining means.

Advantageously, the packing means may be arranged to exert a resilient force on the interfacial members, to ensure an interfacial seal. Synergistically, one or more interfacial members may preferably provide damping for the pump arrangement in a first axial direction, with the packing means providing damping in at least a second, preferably opposed direction.

In one embodiment, the retaining means is arranged such that only the remaining section of the pump arrangement is supported. In such a case, the delivery nozzle section of the pump arrangement does not come into contact with the boss or, if present, a mounting element that cooperates rigidly with the boss. A heat shield may surround at least a part of the delivery nozzle section, and in the case where only the remaining section of the pump arrangement is supported by the retaining means, the delivery section of the pump arrangement does not come into contact with the heat shield. In any embodiment, the heat shield, when present, may optionally be integral with or attached to the retaining means, the boss, the mounting element (when present), or to a gasket or sealing member disposed between the mounting element or the retaining means and the boss.

The packing means may preferably damp vibration of the pump arrangement, so that vibrations from a reciprocating solenoid or other reciprocating actuator within the pump body are transmitted to the exhaust pipe to a lesser degree than would otherwise be the case. Instead, the pump arrangement is acoustically decoupled from the exhaust pipe. Consequently, the operating noise of the pump arrangement is not appreciably amplified by the exhaust pipe when the pump arrangement is in use. Examples of suitably flexible packing materials for providing a damping effect are described below.

The packing means may oppose the ingress of heat into the pump arrangement to thermally decouple the pump arrangement from the exhaust pipe. This helps to reduce the amount of cooling of the pump arrangement and reagent required for efficient and reliable operation of the pump arrangement. To oppose the ingress of heat (i.e. to provide thermal insulation), the packing means may advantageously comprise a packing material having a low thermal conductivity, i.e. below 1 $Wm^{-1}K^{-1}$, preferably below 0.25 $Wm^{-1}K^{-1}$, most preferably below 0.05 $Wm^{-1}K^{-1}$, or even below 0.025 $Wm^{-1}K^{-1}$. Examples of suitably insulating packing materials are provided in the detailed description of preferred embodiments below.

The pump arrangement may include a solenoid-actuated pumping device or other linearly-reciprocable pumping device. In such a pump arrangement, most of the vibration that leads to noise is directed along the axis of the pump arrangement. Accordingly, to enhance axial damping, at least a portion or layer of the packing means may be compressible along an axial direction parallel to a central mounting axis of the pump.

It may be desirable to enhance damping of movement of the pump in the axial direction, whilst providing additional support in the radial direction. To provide enhanced lateral support for the pump, the packing means may preferably be less compressible, or less stiff, in a radial direction, perpendicular to the central mounting axis, than in the axial direction. In other words, the packing means may advantageously comprise at least one anisotropic portion or layer that provides more axial damping than radial damping, or, more radial support than axial support. The packing means may accordingly comprise at least one anisotropic portion or layer being stiffer in a radial direction than in an axial direction parallel to a central mounting axis of the pump arrangement.

To optimise damping and support for the pump arrangement, the packing means may comprise a plurality of layers. Various types of packing materials, such as, for example, those described in the detailed description of the preferred embodiments below, may be used for the layers, in any suitable combination. Advantageous properties of preferred types of packing materials are discussed in the detailed description, and the specifically described combinations of layers have been found to be particularly synergistic and advantageous.

For example, the packing means may comprise at least one insulating layer, and at least one flexible sealing layer arranged to oppose the ingress of hot air towards the insulating layer. At least one support layer may be provided. The support layer may be arranged to provide support for the pump body in a direction perpendicular to a central mounting axis of the pump arrangement.

The mounting arrangement may comprise at least one bracing element for supporting the pump body in a direction perpendicular to a central mounting axis of the pump arrangement. The bracing element may be arranged to form a seal with a suitable component of the pump arrangement and/or the mounting arrangement, to oppose the passage of exhaust gases past the bracing element.

Thus, another embodiment of the invention provides a mounting arrangement for attaching a pump arrangement to an exhaust pipe at a boss, the mounting arrangement comprising: a plurality of packing layers for supporting the pump arrangement; and retaining means including a structure for receiving the packing layers and a mounting element rigidly cooperable with the structure and the boss.

The packing layers, in any embodiment, preferably damp vibration of the pump and oppose the ingress of heat into the pump. Where the pump arrangement comprises a delivery nozzle section and a remaining section, the packing layers may advantageously be arranged to support the pump arrangement at the remaining section. The remaining section of the pump may preferably comprise more than half the weight of the pump and/or the centre of mass of the pump.

Preferably, the structure may define a volume, such as a can, for receiving the packing layers and at least a part of the pump arrangement. In one embodiment, the mounting element comprises a nut having one or more threaded regions for engagement with the structure for receiving the packing layers and/or the boss. In another embodiment, the mounting element comprises a tubular sleeve having one or more flanges for mounting to the structure and/or the boss. In a further embodiment, the mounting element comprises an extended portion of the structure.

In one preferred embodiment, the packing layers may comprise at least one insulating layer having a thermal conductivity below 0.025 $Wm^{-1}K^{-1}$, at least one flexible sealing layer arranged to oppose the ingress of hot air towards the insulating layer, and a support layer arranged to provide lateral support for the pump arrangement, for example perpendicularly to a central mounting axis. Where the structure defines a sealable volume, the support layer may preferably be arranged to exert a compressive force on the other packing layers upon sealing. Advantageously, for enhanced thermal decoupling, the flexible sealing layer and the support layer may also have a low thermal conductivity, preferably below 0.25 $Wm^{-1}K^{-1}$, more preferably below 0.05 $Wm^{-1}K^{-1}$.

In another preferred embodiment, the packing layers may comprise at least one anisotropic layer that provides more axial damping than radial damping (as defined above), at least one insulating layer having a thermal conductivity below 0.025 $Wm^{-1}K^{-1}$, and at least one (flexible) sealing layer arranged to oppose the ingress of hot air towards the insulating layer. Advantageously, for enhanced thermal decoupling, the anisotropic layer and the (flexible) sealing layer may also have a low thermal conductivity, preferably below 0.25 $Wm^{-1}K^{-1}$, more preferably below 0.05 $Wm^{-1}K^{-1}$.

In another embodiment of the invention, there is provided a mounting arrangement for attaching a pump arrangement to an exhaust pipe at a boss, the pump arrangement comprising a delivery nozzle section and a remaining section, wherein the mounting arrangement comprises retaining means for retaining the nozzle section of the pump in the boss, in use; and packing means cooperable with the retaining means, for supporting the pump arrangement at the remaining section of the pump arrangement. The remaining section of the pump arrangement may preferably comprise more than half the weight of the pump and/or the centre of mass of the pump.

A still further embodiment of the invention provides a mounting arrangement for attaching a pump to an exhaust pipe at a boss, the mounting arrangement comprising: packing means for supporting and/or embedding the pump; and retaining means for retaining the pump in the boss, the retaining means defining a volume for receiving the packing means supporting and/or embedding the pump in use.

The invention extends to a dosing device having a mounting arrangement in accordance with any of the above-described embodiments of the invention. The dosing device may comprise a pump arrangement comprising a delivery nozzle section and a remaining section including a pump body.

A second aspect of the invention is based on the appreciation that heat transfer from the exhaust gas stream to a pumping arrangement of a dosing device can be reduced by thermally isolating the pumping arrangement from the exhaust gas stream and from the exhaust pipe.

Accordingly, the second aspect of the invention resides in a dosing device for an exhaust system of an internal combustion engine, the dosing device comprising a pump comprising a pump body; a delivery nozzle for receiving fluid from the pump and having an outlet end from which fluid is expelled into the exhaust system upon operation of the pump; and a mounting arrangement for mounting the pump to an exhaust chamber of the exhaust system, in use. The mounting arrangement comprises a heat shield that surrounds at least an outlet end of the nozzle so as to define an air gap between the heat shield and the nozzle. The heat shield is thermally decoupled from the nozzle and the pump body.

In use, the heat shield deflects the hot exhaust gases in the exhaust system away from or around the outlet end of the nozzle. Consequently, the heat shield is subjected to high temperatures, and itself increases in temperature. By thermally decoupling the heat shield from the nozzle and the pump body, heat transfer by conduction from the heat shield to the nozzle and the pump body is significantly reduced, compared to an arrangement in which the heat shield is directly connected to the nozzle or the pump body, or an arrangement in which a path for heat conduction exists between the heat shield and the nozzle or the pump body by virtue of connected components that are each relatively good heat conductors. Consequently, the second aspect of the invention reduces or mitigates the problem of reagent overheating in the nozzle or the pump body due to the influence of the hot exhaust gases.

In one embodiment, the heat shield is thermally decoupled from the nozzle and the pump body by virtue of there being at least one region of low thermal conductivity material or structure that separates the heat shield from the nozzle and from the pump body. Expressed in another way, all of the available paths for heat conduction from the heat shield to the nozzle and to the pump body through the components of the dosing device include a portion where the conduction of heat is attenuated or reduced, for example by an insulating material and/or a heat-conduction reducing structure, such as a thin-walled component or other structure with a small cross-sectional area.

The thermal decoupling feature of the second aspect of the invention covers, for example, arrangements where the materials used vary along a heat conduction path and arrangements where the materials and/or the structure are altered to reduce thermal conduction between the components of the dosing device, compared to known arrangements in which heat conduction paths from the heat shield to the nozzle and/or the pump body are through a metal component or through one or more connected metal components.

The heat shield may be thermally decoupled from the pump body by way of at least one intermediate component between the heat shield and the pump body. Similarly, the heat shield may be thermally decoupled from the nozzle by way of at least one intermediate component between the heat shield and the nozzle.

The intermediate component, or, where more than one intermediate component is provided, at least one of the intermediate components, may be non-metallic. Accordingly, there may be no path for heat conduction through metallic components of the dosing device between the heat shield and either the nozzle or the pump body. The or at least one intermediate component may comprise a thermally-insulating material.

The dosing device may define one or more heat conduction paths between the heat shield and the nozzle and/or between the heat shield and the pump body, and the or each heat conduction path may include at least one intermediate component. Expressed in another way, no routes are available for heat conduction from the heat shield to the nozzle or the pump body that do not require heat conduction across a poor conductor of heat, such as a non-metallic or thermally-insulating component or, conceivably, a metallic component with a reduced cross-sectional area. In this way, the heat shield is thermally decoupled from the nozzle and the pump body.

The mounting arrangement may comprise packing means for supporting the pump body. The packing means may comprise or embody the intermediate component. The mounting arrangement may comprise a structure, such as a can, for receiving the pump body, and the packing means may be received in the structure.

The mounting arrangement may comprise retaining means for retaining the nozzle in position in the exhaust chamber, in use. The retaining means may comprise the heat shield.

The heat shield may extend beyond the outlet end of the nozzle. In this way, the outlet end of the nozzle is recessed within the heat shield, so as to improve further the benefit of the heat shield in shielding the nozzle from the hot exhaust gases, in use. The nozzle may comprise a nozzle body and an insulating jacket surrounding the nozzle body to define a substantially evacuated compartment in the nozzle. In combination, the substantially evacuated compartment and the heat shield give rise to a substantial benefit in maintaining reagent in the nozzle at an acceptable temperature.

The invention extends to a dosing device according to the second aspect of the invention, having a mounting arrangement according to the first aspect of the invention, and to a heat shield for a dosing device according to the second aspect of the invention.

It will be appreciated that preferred and/or optional features of each aspect and embodiment of the invention described above may be used in the other aspects and embodiments, either alone or in appropriate combination.

Other preferred features and advantages of the invention will be apparent from the detailed description of preferred embodiments below.

BRIEF DESCRIPTION OF THE DRAWINGS

Preferred embodiments of the present invention will now be described, by way of example only, with reference to the accompanying drawings in which.

DETAILED DESCRIPTION OF PREFERRED EMBODIMENTS

A first embodiment of the invention will now be described with reference to FIG. 1, which shows a pump assembly 10 mounted on an exhaust pipe 12 with the help of a mounting boss 14.

The pump assembly 10 has a central mounting axis 16 and comprises: a pump 18 having a pump body 20 and a cylindrical nozzle 22; a sleeve member 24 of generally cylindrical form supported by the nozzle 22; a mounting element in the form of a mounting nut 26 cooperable with the sleeve member; and a can 28 welded to the mounting nut 26, for insulating and supporting the pump 18.

The pump body 20 comprises a conventional solenoid actuator (not shown) that is arranged to pump fluid, generally along the axis 16, from an inlet 30 of the pump to an outlet 32 of the nozzle 22, for example as described in European Patent Application Publication No. EP 1 878 920 A1.

The nozzle 22 of the pump 18 comprises a nozzle body 34 which is connected to the pump body 20 at an end opposite to the outlet 32 of the nozzle 22. The nozzle body 34 comprises a threaded collar 36 supporting the internally-threaded sleeve member 24.

When the pump assembly 10 is mounted on the exhaust pipe 12, the nozzle 22 extends through a port 38 in a wall 40 of the exhaust pipe 12. In this way, fluid dispensed from the outlet 32 of the nozzle 22 in use of the pump 18 enters an exhaust gas stream carried within a bore 42 of the exhaust pipe 12.

The sleeve member 24 comprises a flange 44 extending radially, at an end of the sleeve member closest to the pump body 20. At an opposite end furthest away from the pump body 20, the sleeve member 24 comprises a radial projection 46 having a chamfered region 48 facing away from the pump body 20.

The mounting nut 26, which acts as a retaining means, is generally cylindrical, with a central opening 50, for which the sleeve member 24 is a clearance fit. The mounting nut 26 comprises a faceted portion 52 of relatively large diameter, and an externally-threaded portion 54 of relatively small diameter, joined by a shoulder 55 with an inward-facing annular chamfered edge 58. The faceted portion 52 is arranged to co-operate with a tool such as a spanner for screwing the mounting nut 26 into the mounting boss 14 at the externally-threaded portion 54, as will be described.

The externally threaded portion 54 of the mounting nut 26 is joined, via a funnel-shaped annular chamfer 56, to a cylindrical heat-shield 59 for surrounding the nozzle 22 in use (upon cooperation of the mounting nut 26 with the pump 18, as will be described). The heat-shield 59 is sized and shaped to provide an annular, generally cylindrical air-gap 60 between the nozzle 22 and the heat shield 59. This air gap 60 provides additional thermal insulation for the nozzle 22 in use, due to the low thermal conductivity of air.

The mounting nut 26 cooperates with, and supports the pump 18 substantially as described in EP 08169996.9, namely with the help of damping/resilient and heat-resistant retention means in the form of O-rings 62, 64, made, for example, from a suitable polymeric material, such as Kalrez® Spectrum 7075, a commercially available perfluoroelastomer. A first O-ring 62 is received within a space defined by the flange 44 of the sleeve member 24, an inner side wall of the mounting nut 26, and the radial projection 46 of the sleeve member 24. A second O-ring 64 is received within a space defined by the chamfered region 48 of the radial projection 46 of the sleeve member 24, the inner side wall of the mounting nut 26, and the funnel-shaped chamfer 56 of the mounting nut 26.

When the sleeve member 24 and O-rings 62, 64 are pushed into the mounting nut 26, both O-rings 62, 64 are compressed against the sleeve member 24, which is attached to the nozzle body 34. Therefore, and particularly due to the funnel-shaped chamfer 56, the nozzle 22, and the pump 18 as a whole are located, held and damped with respect to the mounting nut 26. The first O-ring 62 primarily damps radial movement of the sleeve member 24 with respect to the mounting nut 26. The second O-ring 64 primarily damps axial movement of the sleeve member 24 with respect to the mounting nut 26. Additionally, the second O-ring 64 assists in locating or centering the sleeve member 24 with respect to the mounting nut 26, and prevents ingress towards the pump 18 of air from the air gap 60 between the heat shield 59 and the nozzle 22.

Whilst the O-rings 62, 64 provide a degree of hold, the pump 18 is additionally supported with respect to the mounting nut 26 by the can 28, as will now be described. The additional support form the can 28 (and its inserts) enhances durability of the mounting arrangement by providing resistance to periods of high excitation of the exhaust 12. Additionally, the can 28 performs an insulating function.

The can 28 holds the pump 18 within packing means in the form of a bed of packing material 66. Accordingly, the can 28 has a can body 68 having a shape generally conforming to an enlarged form of the pump body 20 (which is generally cylindrical in this embodiment). A nozzle-facing end 70 of the can body 68 is welded, for example by laser, to the faceted portion 52 of the mounting nut 26, providing a rigid connection thereto. The opposite end 72 of the can body 68 comprises an opening co-operable with a can-sealing lid 74, which is welded into position, for example by laser, once the pump 18 and packing material 66 have been inserted. The can-sealing lid 74 comprises an aperture for an inlet arrangement 76 (including power supply) of the pump, which extends beyond the pump body 20, forming a shoulder 78 of the pump body 20.

The packing material 66 comprises three distinct components, namely a thermally insulating material 80; a sealing material 82; and a support material 84.

The insulating material 80, which may for example be non-reinforced silicon sponge rubber, or a microporous ceramic powder (sold, for example, under the trade name Microtherm®), surrounds the pump body 20 radially, within the faceted portion 52 of the mounting nut 26 and the majority of the can body 68, up to about the shoulder 78 of the pump body 20. The insulating material 80 thus assists in preventing heat from penetrating into the pump body 20, and provides a degree of lateral support to the pump 18. The insulating material typically has a thermal conductivity below 0.025 $Wm^{-1}K^{-1}$.

At the shoulder 78 of the pump body 20, a layer of sealing material 82 acts as a gasket and seals the insulating material 80 and pump body 20 from the outside environment. Any appropriate sealing material 82 may be selected, although a flexible and compressible layer of silicone sponge rubber has been found to be particularly suitable. Compressible sealing materials have the advantage of providing axial damping for the pump 18, thereby contributing to a reduction in noise levels. The layer of sealing material 82 comprises a central aperture to allow for the inlet arrangement 76 of the pump 18. The sealing material typically has a thermal conductivity below 1 $Wm^{-1}K^{-1}$, preferably below 0.25 $Wm^{-1}K^{-1}$.

A void between the sealing material, lateral walls 86 of the can body 68, and the can-sealing lid 74 is filled by support material 84. The support material 84 functions to transfer, upon closure of the can 28 with the lid 74, compressive force into the can 28, and thereby onto the pump 18 and the O-rings 62, 64 at the interface between the sleeve member 24 and the mounting nut 26. This ensures that there is a tight fit and seal between the pump 18 as a whole and the mounting nut 26.

Importantly, the support material 84 also supports the pump 18 laterally, by extending radially between the pump 18 and the lateral walls 86 of the can body 68. Notably, the can body 68 is rigidly fixed to the exhaust 12 via the mounting nut 26 and mounting boss 14. Supporting the pump 18 laterally on the can body 68 via the support material 84 leads to improved durability by taking load-bearing strain off the mounting nut 26, and particularly the O-ring interface.

The support material 84 may take any suitable form, although a degree of rigidity and low thermal conductivity are preferable properties. PTFE has been found to be suitable. In one particularly preferred variant of this embodiment, the support material 84 is more compressible along the mounting axis 16 of the pump than perpendicular to the mounting axis 16 of the pump. Glass-reinforced silicon sponge rubber is suitable, for example, for providing such anisotropic properties, which ensure that the pump 18 is provided both with particularly enhanced axial damping and with particularly strong lateral support. The support material typically has a thermal conductivity below 1 $Wm^{-1}K^{-1}$, preferably below 0.25 $Wm^{-1}K^{-1}$.

Notably, despite the lateral support of the pump 18 via the support material 84 and the can body 68, there is no rigid or stiff mechanical connection between the pump 18 and the mounting nut 26, so that the pump 18 remains acoustically and thermally decoupled from the mounting nut 26. The clearance, by virtue of the O-rings, between the sleeve member 24 and the mounting nut 26 prevents any rigid mechanical connection, as does the packing material 66 between the pump body 20 and the can body 68.

The pump assembly 10 as a whole is held in position, with the outlet 32 in the bore 42, by the mounting boss 14. The mounting boss 14 is welded to the wall 40 of the exhaust pipe 12 and has an end portion 88 of generally cylindrical form. In this embodiment, a cylinder axis of the mounting boss 14 is at approximately 45 degrees to the longitudinal axis of the exhaust pipe 12. However, other suitable angles may be chosen.

The end portion 88 of the mounting boss 14 carries an internal thread to receive the mounting nut 26. Thus, the mounting nut 26, with the remaining components of the pump assembly 10 attached, is screwed into the mounting boss 14, which in this embodiment is formed with heat-dissipating fins 90 to aid cooling of the mounting boss 14.

A clearance exists between the nozzle 22 and the mounting boss 14 where the nozzle 22 extends through the mounting boss 14, and no part of the pump 18 is in direct contact with the mounting boss 14. Therefore, crucially, acoustical and thermal decoupling of the pump 18 from the mounting nut 26, as discussed above, equates to acoustical and thermal decoupling of the pump 18 from the mounting boss 14 and the exhaust 12.

As noted above, the heat shield 59 defines an air gap 60 between the heat shield 59 and the nozzle 22, which helps to reduce heat transfer from the hot exhaust gases in the exhaust pipe bore 42 to the nozzle 22. The heat shield 59 deflects the exhaust gases around the nozzle 22 and prevents the gases from impinging directly on the nozzle 22.

It will be appreciated that, in such an arrangement, the heat shield 59 is exposed directly to the exhaust gas stream and therefore tends to become significantly heated, in use. The heat shield 59 is typically made from a metal, such as stainless steel. It is a further advantageous feature of the pump assembly 10 shown in FIG. 1 that the heat shield 59 is thermally decoupled or isolated from the pump 18 and the nozzle 22. In this way, heat transfer from the hot heat shield 59 to the reagent-carrying components of the pump assembly 10, specifically the pump 18 and the nozzle 22, is minimised so as to reduce further the risk of overheating of the fluid.

Figure 1:
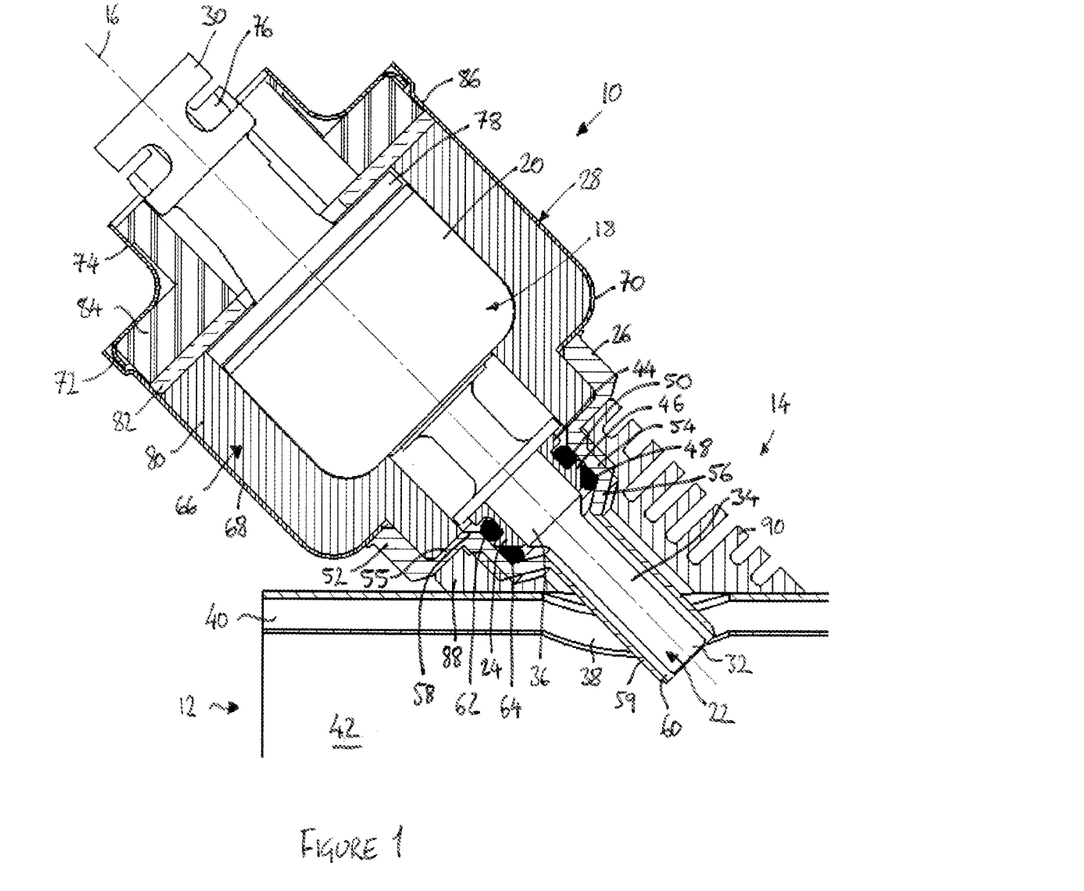
FIG. 1 is a part-sectional side view showing a reagent pump and part of an exhaust pipe illustrating a mounting arrangement according to a first embodiment of the invention.

In the FIG. 1 example, to achieve the thermal decoupling or isolation, the pump assembly 10 is arranged such that there is no significant heat conduction path between the heat shield 59 and the pump 18 and nozzle 22 respectively. In particular, as can be appreciated from FIG. 1, the heat shield 59 is connected to the body 20 of the pump 18, and to the nozzle 22, only by way of components made from non-metallic materials having poor heat conduction properties.

For instance, the heat shield 59 in this example is formed as part of the mounting nut 26. However, the mounting nut 26, and hence the heat shield 59, is thermally decoupled from the nozzle 22 by way of the rubber 'O' rings 62, 64 as previously described. The 'O' rings 62, 64 provide an intermediate thermally-insulating component to interrupt or substantially reduce the heat conduction path between the heat shield 59 and the nozzle 22.

As can be seen from FIG. 1, there is no continuous path for heat conduction from the heat shield 59 to the nozzle 22 through metal components. Instead, the only heat conduction paths available include thermally-insulating components. It will be appreciated in this regard that, while heat conduction will take place to a degree through insulating materials and across air gaps, the amount of heat conducted in this way will have a very small or negligible effect on the propensity of the nozzle 22 to heat up compared to the amount of heat conduction that could occur through contacting metal components.

The mounting nut 26 is connected to the metal can body 68, so that a metal-to-metal heat conduction path exists between the heat shield 59 and the can body 68. However, because of the packing material 66, and particularly the insulating material 80, there is no metal-to-metal heat conduction path between the can body 68 and the pump body 20. Accordingly, the heat shield 59 is also thermally decoupled from the pump body 20 by the presence of the intermediate non-metallic packing material 66.

The metals used for the heat shield 59, mounting nut 26, can body 68 and other pump components can be selected so as to have a low thermal conductivity, so as to impede heat conduction from the heat shield 59 to the other parts of the pump assembly 10. Furthermore, these metal components can be designed so as to minimise heat conduction, for example by making the walls of the can body 68 as thin as possible.

Nevertheless, by also ensuring that at least one intermediate component is present to interrupt or substantially diminish any possible heat conduction paths between the heat shield 59 and the pump body 20, and similarly between the heat shield 59 and the nozzle 22, heat conduction from the heat shield 59 to the reagent-carrying components of the pump assembly 10 is substantially reduced. The intermediate components are preferably non-metallic and may be made from insulating materials. Again, therefore, the only heat conduction paths available between the heat shield 59 and the pump body 20 include thermally-insulating components.

Figure 2:
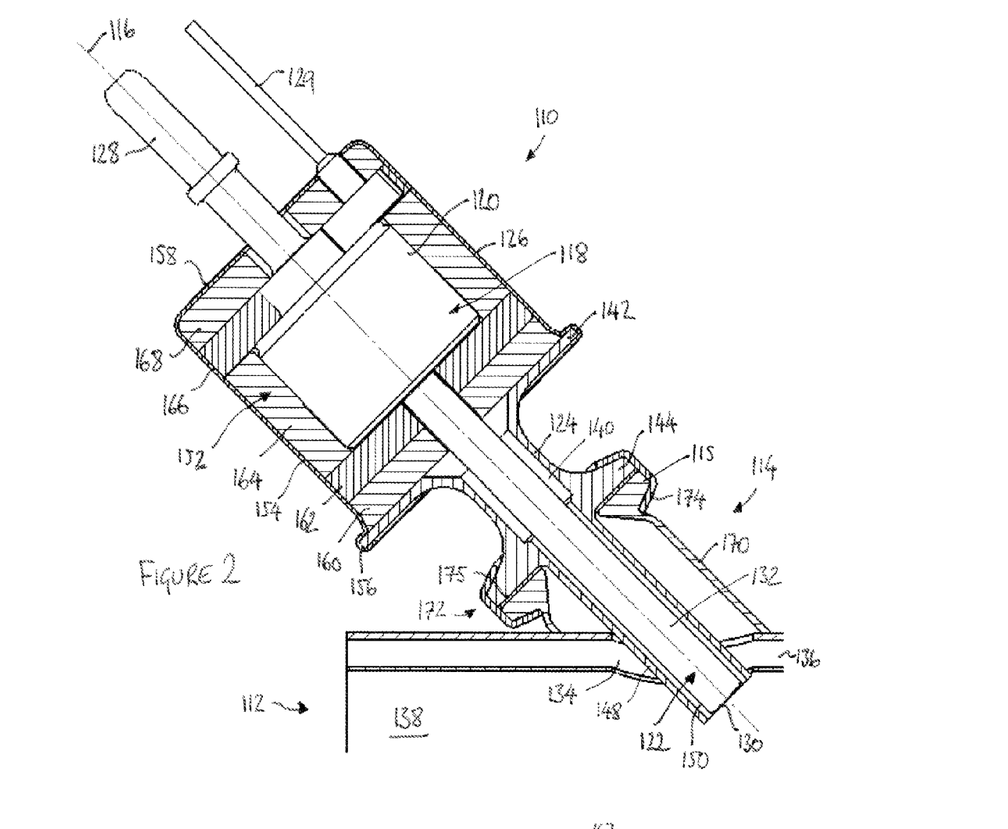
FIG. 2 is a part-sectional side view showing a part of a reagent pump and part of an exhaust pipe illustrating a mounting arrangement according to a second embodiment of the invention.

A second embodiment of the present invention will be described with reference to FIG. 2, which shows a pump assembly 110 mounted on an exhaust pipe 112 with the help of a mounting boss 114.

The pump assembly 110 has a central axis 116 and comprises: a pump 118 having a pump body 120 and a cylindrical nozzle 122; a mounting element 124; and a can 126 welded to the mounting element 124, for insulating and supporting the pump 118.

The pump body 120 comprises a conventional solenoid actuator (not shown) that is arranged to pump fluid, generally along the axis 116, from an inlet 128 of the pump to an outlet 130 of the nozzle 122, for example as described in European Patent Application Publication No. EP 1 878 920 A1. The nozzle 122 of the pump 118 comprises a nozzle body 132 which is connected to the pump body 120 at an end opposite to the outlet 130 of the nozzle 122.

When the pump assembly 110 is mounted on the exhaust pipe 112, the nozzle 122 extends through a port 134 in a wall 136 of the exhaust pipe 112. In this way, fluid dispensed from the outlet 130 of the nozzle 122 in use of the pump 118 enters an exhaust gas stream carried within a bore 138 of the exhaust pipe 112.

The mounting element 124, which acts as a retaining means, comprises a generally cylindrical sleeve, with a central opening 140, into which the nozzle 122 is inserted as a clearance fit. A first flange 142 of the mounting element 124 extends radially at an end of the mounting element closest to the pump body 120, whilst a second flange 144 extends radially at a position further away from the pump body 120. The first flange 142 engages, and acts as a wall of, the can 126, whilst the second flange 144 acts as one half of a mounting clamp 172, together with the mounting boss 114, as will be described.

Beyond the second flange 144, i.e. still further away from the pump body 120, the mounting element 124 forms a cylindrical heat-shield 148 for surrounding the nozzle 122 in use. The heat-shield 148 is sized and shaped to provide an annular, generally cylindrical air-gap 150 between the nozzle 122 and the heat shield 148. This air gap 150 provides additional thermal insulation for the nozzle 122 in use, due to the low thermal conductivity of air.

The can 126 holds the pump 118 within packing means taking the form of a bed of packing material 152. Accordingly, the can 126 has a can body 154 having a shape generally conforming to an enlarged form of the pump body 120 (which is generally cylindrical in this embodiment). A nozzle-facing first end 156 of the can body 154 is welded, for example by laser, to the first flange 142 of the mounting element 124, providing a rigid connection thereto. The opposite, second end 158 of the can body 154 is sealed, save for two apertures for the inlet 128 and power supply or electrical connection 129 of the pump.

The packing material 152 comprises (listed in nozzle to pump body direction) the following layers: a first layer 160 of sealing material; a second layer 162 of damper material; a third layer 164 of insulating material; a fourth layer 166 of damper material; and a fifth layer 168 of sealing material. All the layers 160, 162, 164, 166, 168 are suitably annular to allow for the presence of the pump 118, with the third layer 164 having a particularly large central aperture to accommodate the pump body 120. In combination with each other and the pump 118, the layers 160, 162, 164, 166, 168 fill or pack substantially the entire volume of the can 126, thereby providing support for the pump 118 in an analogous but improved manner compared to the packing material 66 in the first embodiment.

The first layer 160 of sealing material lies between the first flange 142 of the mounting element 124, and the second layer 162. The first layer 160 of sealing material acts as a gasket and seals the other layers 162, 164, 166, 168 and pump body 120 from the outside environment, and in particular the hot air in the air gap 150. Any appropriate sealing material may be selected, although a flexible and compressible layer of silicone sponge rubber has been found to be particularly suitable. As in the first embodiment, compressible sealing materials have the advantage of providing damping for the pump 118, thereby contributing to a reduction in noise levels. The sealing material typically has a thermal conductivity below 1 $Wm^{-1}K^{-1}$, preferably below 0.25 $Wm^{-1}K^{-1}$.

The second layer 162 of damper material lies between the first layer 160 of sealing material and the third layer 164. The second layer 162 of damper material serves primarily to provide damping, or resilient freedom of movement for the pump 118, to assist acoustical and thermal decoupling of the pump 118 from the mounting boss 114 and exhaust pipe 112. Additionally, the second layer 162 of damper material provides a degree of lateral support for the pump 118. Acoustical and thermal decoupling (damping) and lateral support are important and advantageous for the reasons set out above in respect of the first embodiment.

Any suitable material may be chosen to act as damper material. However, in one particularly preferred variant of the second embodiment, the second layer 162 of damper material is more compressible along the mounting axis 116 of the pump 118 than in the perpendicular to the mounting axis 116 of the pump 118. Glass-reinforced silicon sponge rubber, for example, provides such anisotropic properties, which ensure that the pump 118 is provided both with particularly enhanced axial damping and with particularly strong lateral support. The damper material typically has a thermal conductivity below 1 $Wm^{-1}K^{-1}$, preferably below 0.25 $Wm^{-1}K^{-1}$. Another suitable material for the second layer 162 of damper material is microporous ceramic powder.

The third layer 164 of insulating material lies between the second layer 162 of damping material and the fourth layer 166. The third layer 164 of insulating material spans the axial length of the pump body 120 and serves primarily to prevent heat from penetrating into the pump body 120. Additionally, the third layer 164 provides a degree of lateral support to the pump 118. Any suitable insulating material can be chosen, although non-reinforced silicon sponge rubber has been found to provide a particularly good combination of thermal insulation and lateral support. The insulating material typically has a thermal conductivity below 0.025 $Wm^{-1}K^{-1}$. Another suitable insulating material for the third layer 164 is microporous ceramic powder.

The fourth layer 166 of damper material lies between the third layer 164 of insulating material and the fifth layer 168. The fourth layer 164 of damper material is identical in function to the second layer 162 of damper material. Again, any suitable material may be chosen, although an anisotropic layer such as, for example, glass-reinforced silicon sponge rubber provides particularly beneficial damping and support results. In this regard, and with respect to other options for the fourth layer 166, reference is made to the description of the second layer 162.

Figure 3:
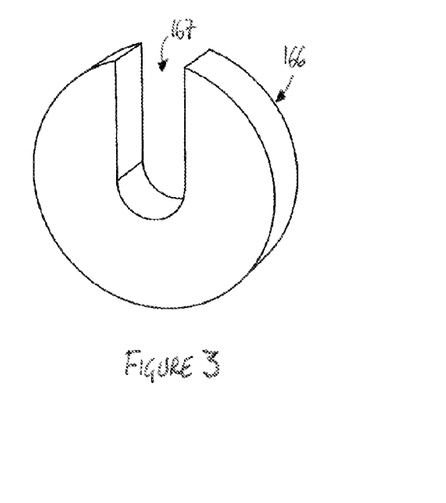
FIG. 3 is a schematic perspective view of a component of the mounting arrangement of FIG. 2.

The fourth layer 166 of damper material is shaped to accommodate the inlet 128 of the pump and the electrical connection 129. FIG. 3, for example, shows a suitable configuration for the fourth layer 166, in which a slot or cut out 167 is provided. The cut out 167 extends outwardly from the centre of the circular layer 166, so that the fourth layer 166 has a generally 'C'-shaped form.

The fifth layer 168 of sealing material lies between the fourth layer 166 of damper material and the second end 158 of the can 126. The fifth layer 168 of sealing material is identical in function to the first layer 160 of sealing material, although, as the fifth layer is on a side of the pump 118 opposite to the nozzle 122, it is less likely to come into contact with hot exhaust air. Again, any appropriate sealing material may be selected, although a flexible and compressible layer of silicone sponge rubber has been found to be particularly suitable. As aforesaid, compressible sealing materials have the advantage of providing damping for the pump 118, thereby contributing to a reduction in noise levels. Reference is made to the description of the first layer 160 with regard to options for the fifth layer 168.

Figure 4:
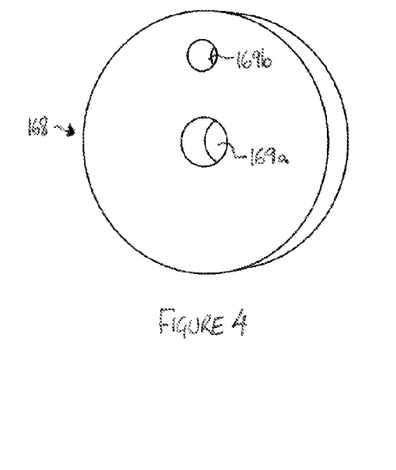
FIG. 4 is a schematic perspective view of another component of the mounting arrangement of FIG. 3.

As for the fourth layer 164, the fifth layer 168 must accommodate the inlet 128 and the electrical connection 129. One example of a suitable shape for the fifth layer 168 is shown in FIG. 4. In this case, the fifth layer 168 is provided with a central hole or aperture 169a to accommodate the inlet 128, and a further aperture 169b, radially offset from the central aperture 169a, to accommodate the electrical connection 129.

The pump assembly 110 is held in position, with the outlet 130 in the bore 138, by the mounting boss 114. The mounting boss 114 is welded to the wall 136 of the exhaust pipe 112 and has an end portion 170 of generally cylindrical form. In this embodiment, a cylinder axis of the mounting boss 114 is at approximately 45 degrees to the longitudinal axis of the exhaust pipe 112. However, other angles may be chosen as suitable.

The mounting boss 114 of this embodiment combines with the mounting element 124 to form a mounting clamp 172 (dairy style), which is held together by pipe clamp(s) 174. Specifically, the second flange 144 of the mounting element 124 is clamped to an end flange 115 of the mounting boss 114 by the pipe clamps 174. A sealing gasket 175 is provided between the flanges 144, 115 to prevent the escape of exhaust gases at the clamp interface. Thus, the mounting element 124, with the remaining components of the pump assembly 110 attached, is clamped onto the mounting boss 114.

A clearance exists between the nozzle 122 and the mounting boss 114 where the nozzle 122 extends through the mounting boss 114, and no part of the pump 118 is in direct contact with the mounting boss 114. Therefore, crucially, acoustical and thermal decoupling of the pump 118 from the mounting boss 114 and the exhaust is provided.

As in the first embodiment of the invention, in this second embodiment all of the available heat conduction paths between the heat shield 148 and the nozzle 122, and between the heat shield 148 and the pump body 120, include thermally-insulating, non-metallic components. In this example, the packing material 152 provides the intermediate component that thermally decouples the heat shield 148 from the reagent-carrying parts of the pump assembly 110.

The second embodiment of the invention provides a mounting arrangement for a pump that provides damping without the need for O-rings or other damping means at the mounting interface, particularly due to the presence of the second and fourth layers of damping material in the can. Accordingly, the second embodiment of the invention offers a more simple and low-cost solution to the problem of acoustical and thermal decoupling.

Figure 5:
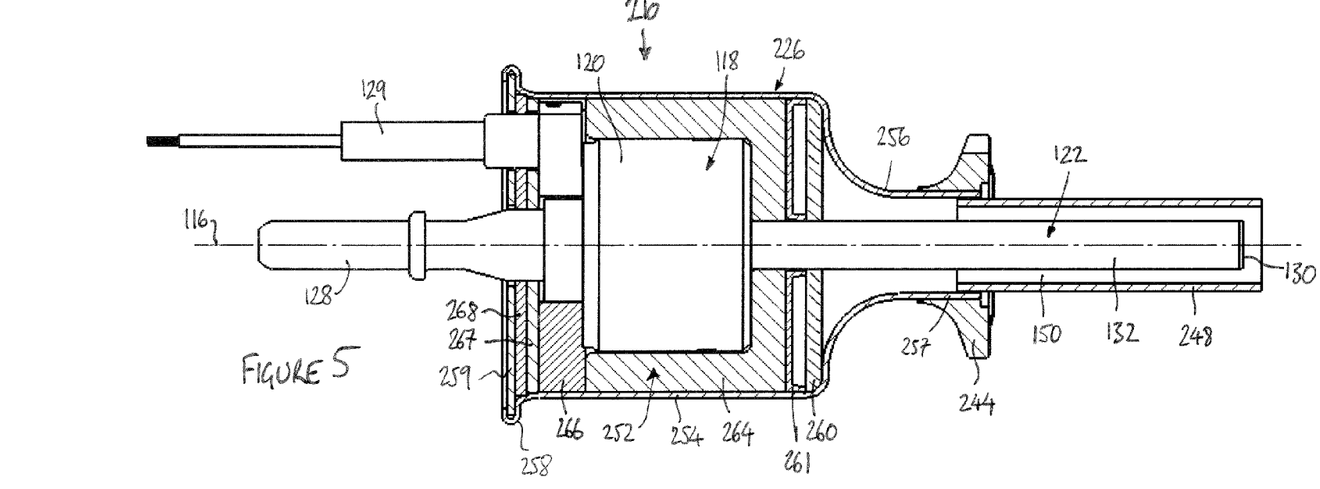
FIG. 5 is a part-sectional side view showing a reagent pump, illustrating a mounting arrangement according to a third embodiment of the invention.

A third embodiment of the invention is shown in FIG. 5. In this embodiment, a dosing pump arrangement 210 is provided that shares many common features with the second embodiment of the invention. Accordingly, only those features of the third embodiment that differ from those of the second embodiment are described in detail below, and like reference numerals are used to denote common features shared between the embodiments.

In this third embodiment, a structure in the form of a can 226 that receives the pump 118 comprises a can body 254 having a shape that generally conforms to an enlarged form of the pump body 120. A nozzle-facing first end 256 of the can body 254 is extended towards the nozzle to define a cylindrical end region 257. A mounting flange 244 is welded or otherwise attached to an outer surface of the cylindrical end region 257 of the can body 254. The mounting flange 244 performs the same function as the second flange 144 of the mounting element 124 of the second embodiment of the invention. In this third embodiment, therefore, a separate mounting element is not present. Instead, the first end 256 of the can body 254 and the mounting flange 244 together act as a mounting element for the can body 254.

A tubular heat shield 248, which performs the same function as the heat shield 148 of the second embodiment, is welded to or otherwise attached to an inner surface of the end region 257 of the can body 254. In this embodiment, the end of the heat shield 248 extends beyond the outlet end 130 of the nozzle 122, such that the outlet end 130 of the nozzle 122 is recessed within the heat shield 248. In this way, the outlet end 130 of the nozzle is more effectively shielded from hot exhaust gases when the pump arrangement 210 is mounted in an exhaust pipe (not shown).

The can body 254 may be manufactured by deep drawing, or by other suitable means. Although the can body 254, the heat shield 248 and the mounting flange 244 are shown as separate components in FIG. 5, It will be appreciated that any two or all three of the can body 254, the heat shield 248 and the mounting flange 244 could be integrated in a single component, depending on manufacturing and other considerations.

A second end of the can body 254, opposite the first end 256, is closed by a suitable end plate or lid 259, which is, for example, crimped or welded to the can body 254.

As in previous embodiments of the invention, the can 226 holds the pump 118 within packing means taking the form of a bed of packing material 252. The packing material 252 comprises (listed in nozzle to pump body direction) the following layers: a first layer 260 of sealing material; a bracing element 261, to be described in more detail below; a second layer 264 of insulating material; a third layer 266 of damper material; a fourth layer 267 of support material; and a fifth layer 268 of sealing material. As in previous embodiments, the layers 260, 264, 266, 268 provide support for the pump 118 whilst thermally and acoustically decoupling the pump 118 from the mounting arrangement 114. Reference should be made to the corresponding layers in the first and second embodiments of the invention as regards suitable material selection for the layers 260, 264, 266, 268.

As noted above, the can 226 houses a bracing element in the form of a bracing disc 261. The bracing disc 261 is shown in more detail in FIG. 6. The bracing disc 261 comprises an annular base plate 261a having an outside diameter that is an interference fit within the can 226, and a central aperture 261b that is an interference fit around the nozzle 122. The periphery of both the base plate 261a and the aperture 261b carry walls 261c that diverge slightly moving outwards from the base plate 261a. In this way, when in position, the bracing disc 261 is firmly fixed between the can body 254 and the nozzle 122 and forms a gas-tight seal.

Figure 6:
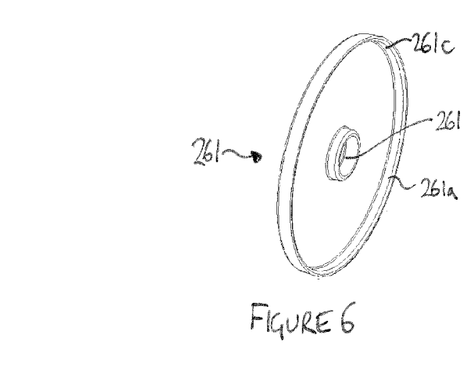
FIG. 6 is a schematic perspective view of a component of the mounting arrangement of FIG. 5.

The bracing disc 261 is made from a relatively stiff plastics material such as PTFE, polyimide, or a suitable fluoropolymer, or reinforced or filled composites containing these or other polymers. More generally, suitable materials for the bracing disc 261 are capable of retaining their mechanical stability, and in particular a suitably high rigidity, at the lower and upper extremes of temperature that the disc 261 could be subjected to, in use. For example, the material of the bracing disc 261 preferably retains its mechanical performance in the range of temperatures between −40° C. and +250° C. The disc 261 is preferably injection moulded, although other suitable plastics forming techniques known in the art could be used to make the disc 261.

The bracing disc 261 offers relatively rigid radial support to the pump 118 and the nozzle 122, by maintaining the position of the nozzle 122 with respect to the can body 254. Therefore the mechanical stability of the pump arrangement 210 is improved. Although the bracing disc 261 is relatively rigid in the radial direction, the bracing disc 261 is compliant to movement in the direction parallel to the axis 116. Therefore the bracing disc 261 does not appreciably reduce the advantageous acoustic attenuation provided by the packing means 252, and in particular the damper material 266 and sealing material 268. Because the bracing disc 261 is of a plastics material, the bracing disc 261 is a poor heat conductor and does not provide a good path for heat conduction from the can body 254 to the nozzle 122.

The walls 261c of the bracing disc 261 press against the can body 254 and the nozzle 122, thereby providing a seal that guards against exhaust gases passing through the air gap 150 between the heat shield 248 and the nozzle 122 and into the packing material 252. Advantageously, by virtue of the divergence of the walls 261c, the sealing effect of the bracing disc 261 is not affected by slight dimensional variations in the can body 254. Furthermore, the divergence of the walls 261c allows the seal to be maintained through the entire operational temperature range of the dosing device, by accommodating dimensional changes in the disc 261 and the can 254 due to thermal expansion and contraction.

In FIG. 5, the bracing disc 261 is provided between the first layer 260 of sealing material and the second layer 264 of insulating material. However, since the bracing disc 261 provides a sealing function, the first layer 260 of sealing material could be omitted. When a first layer 260 of sealing material, such as silicone sponge, is provided, the first layer 260 could be spaced from the base plate 261a of the bracing disc 261 as shown in FIG. 5, or alternatively the first layer 260 of sealing material could be shaped so as to conform to the shape of the bracing disc 261, in which case the first layer 260 of sealing material may abut the base plate 261a.

The bracing element may have a different form to that shown in FIGS. 5 and 6. For example, instead of a planar base plate 261a, the base plate may be shaped to provide a spring-like effect that biases the peripheries of the base plate and the central aperture (and the associated walls, if present) into contact with the can and the nozzle body, respectively. For instance, the base plate may be dished or cupped. More than one bracing element may be provided. For example, one or more additional bracing elements could be provided around the nozzle 122, around the pump body 120 and/or around the inlet connection 128.

The fourth layer 267 of support material performs a similar function to the bracing element 261. Although the fourth layer 267 of support material does not perform a sealing function in this embodiment (although, in other embodiments, this could be the case), it does provide a relatively stiff radial support for the pump 118. The fourth layer 267 of support material is positioned around the inlet 128, and accordingly includes apertures that accommodate the inlet 128 and the electrical connection 129. The fourth layer 267 of support material therefore has a similar form to the layer shown in FIG. 4. The fourth layer 267 of support material is made from a semi-rigid material, such as fibre-reinforced polyamide or nitryl rubber with aramid fibre reinforcement.

Like the bracing disc 261, the function of the fourth layer 267 of support material is to guard against lateral movement of the pump 118. Such lateral movement can be caused at the inlet end of the pump 118 particularly due to the mass of the pump body 120 and, in use, due to the mass of a supply hose connected to the inlet 128. It will be appreciated that excessive lateral movement of the pump 118 away from the central axis 116 is undesirable, for example due to the risk of the nozzle 122 coming into contact with the heat shield 248. The bracing disc 261 and the fourth layer 267 together help to minimise movement of the pump 118 away from its intended position along the axis 116. Said another way, the bracing disc 261 and the fourth layer 267 each help to maintain the concentricity of the pump 118 and the can 226, and the concentricity of the nozzle 122 and the heat shield 248.

Figure 7:
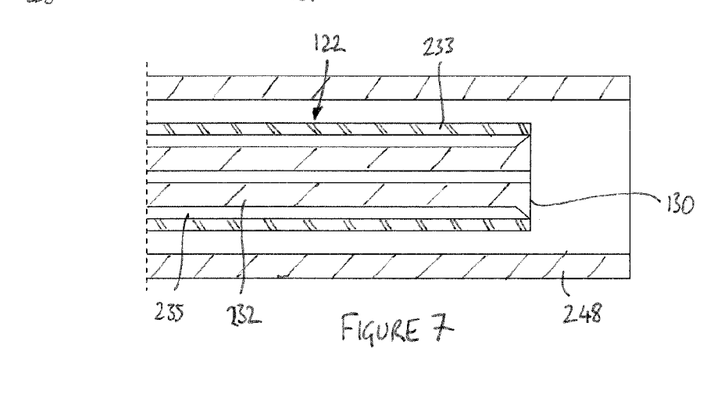
FIG. 7 is a schematic cross-sectional view of part of the reagent pump of FIG. 5.

FIG. 7 shows, in cross section, the outlet end region of an optional variant of the pump arrangement 210 of FIG. 5. In this case, to reduce further the likelihood of the reagent becoming overheated as it flows through the pump arrangement 210 to the outlet end 130 of the nozzle 122, the nozzle body 232 is surrounded by a tubular jacket 233. The jacket 233 is sealingly attached to the nozzle body 232 at the outlet end 130 of the nozzle 122, and also at a second end of the nozzle (not shown in FIG. 7). In this way, the jacket 233 defines a compartment 235 in the nozzle 122, which reduces radial heat conduction through the walls of the nozzle 122. Preferably, the compartment 235 is substantially evacuated. The outlet end 130 of the nozzle may include an outlet valve (not shown).

In combination, the heat shield 248 and the evacuated compartment 235 together guard against heating of the nozzle 122 in the region of the outlet end 130 due to the direct influence of the exhaust gases in the exhaust pipe. Furthermore, indirect heating of the nozzle 122 is avoided by virtue of the insulating packing material 252 that interrupts the heat conduction path between the heat shield 248 and the nozzle 122.

It is possible to combine and/or replace compatible aspects and features of the first, second and third embodiments, and indeed features disclosed more generally in the summary of the invention, as will be apparent to the skilled person in light of this disclosure. For example, although the second and third embodiments provide damping without O-rings or other interfacial damping means at the mounting interface, such members could be introduced to further enhance acoustical and thermal decoupling, particularly during periods of high agitation and vibration. This would in turn enhance durability yet further. Similarly, the structure of the mounting element and mounting boss may be varied in a great number of ways by the skilled person without affecting the working of the invention.

The invention claimed is:

1. A mounting arrangement for attaching a pump arrangement to an exhaust pipe at a boss, the pump arrangement comprising a delivery nozzle section and a remaining section including a pump body, wherein the mounting arrangement comprises packing radially surrounding the pump body for supporting the pump body at the remaining section of the pump arrangement.

2. A mounting arrangement according to claim 1, wherein the remaining section of the pump arrangement comprises more than half the weight of the pump arrangement and/or the centre of mass of the pump arrangement.

3. A mounting arrangement according to claim 1, further comprising a retainer for retaining the nozzle section of the pump arrangement in the boss, in use, and wherein the mounting arrangement is cooperable with the retainer.

4. A mounting arrangement according to claim 3, wherein the retainer comprises a can that defines a volume for receiving the packing and wherein the packing comprises one or more inserts of packing material, the inserts being received within the volume.

5. A mounting arrangement according to claim 3, wherein the retainer is arranged to be rigidly cooperable with the boss and wherein the packing provides flexible support for the pump body with respect to the retainer.

6. A mounting arrangement according to claim 1, wherein the packing is arranged to damp vibration of the pump body.

7. A mounting arrangement according to claim 1, wherein the packing is arranged to thermally insulate the pump body.

8. A mounting arrangement according to claim 1, wherein the packing comprises at least one anisotropic portion or layer being stiffer in a radial direction than in an axial direction parallel to a central mounting axis of the pump arrangement.

9. A mounting arrangement according to claim 1, wherein the packing comprises a plurality of layers including at least one insulating layer, and at least one flexible sealing layer arranged to oppose the ingress of hot air towards the insulating layer.

10. A mounting arrangement according to claim 1, wherein the packing comprises a plurality of layers including at least one support layer arranged to provide support for the pump body in a direction perpendicular to a central mounting axis of the pump arrangement.

11. A mounting arrangement according to claim 1, comprising at least one bracing element for supporting the pump body in a direction perpendicular to a central mounting axis of the pump arrangement.

* * * * *